US010834873B2

(12) United States Patent
Korthuis et al.

(10) Patent No.: US 10,834,873 B2
(45) Date of Patent: Nov. 17, 2020

(54) BERRY HARVESTER WEIGHING SYSTEM

(71) Applicant: Oxbo International Corporation, Byron, NY (US)

(72) Inventors: Scott Korthuis, Lynden, WA (US); Matthew Schleicher, Lake Elmo, MN (US)

(73) Assignee: Oxbo International Corporation, Byron, NY (US)

( * ) Notice: Subject to any disclaimer, the term of this patent is extended or adjusted under 35 U.S.C. 154(b) by 197 days.

(21) Appl. No.: 16/005,360

(22) Filed: Jun. 11, 2018

(65) Prior Publication Data
US 2019/0166763 A1 Jun. 6, 2019

Related U.S. Application Data

(60) Provisional application No. 62/593,751, filed on Dec. 1, 2017.

(51) Int. Cl.
*A01D 46/26* (2006.01)
*G08B 21/18* (2006.01)
(Continued)

(52) U.S. Cl.
CPC ....... *A01D 46/264* (2013.01); *G01G 13/2858* (2013.01); *G01G 19/08* (2013.01); *G01G 19/52* (2013.01); *G08B 21/182* (2013.01)

(58) Field of Classification Search
CPC .... G01G 19/08; G01G 19/52; G01G 13/2858; G01G 19/393; G01G 13/02; G01G 19/12;
(Continued)

(56) References Cited

U.S. PATENT DOCUMENTS 3,073,399 A * 1/1963 Durand .................. G01G 13/02
177/53
3,416,619 A * 12/1968 McClusky ............... B65B 1/34
177/53
(Continued)

FOREIGN PATENT DOCUMENTS

KR 2001079052 A * 8/2001 ............. B07B 13/08
NL 9201646 A * 4/1994 ........... B65B 25/046

OTHER PUBLICATIONS

Prior Art, FairPick Pro, A Better Weigh, Automated Weighing System, 2nd Sight Bioscience, www.2ndsightbio.com, four pages.
(Continued)

*Primary Examiner* — Arpad Fabian-Kovacs
(74) *Attorney, Agent, or Firm* — Merchant & Gould P.C.

(57) ABSTRACT

A berry harvester includes a chassis, a berry removal system, a berry delivery system, an inspection station and a container filling station. The container filling station includes a berry delivery apparatus that conveys berries to containers on a container support. A container weighing system includes a container fill indicator generating a weighing signal. A processor is in communication with the weighing system and incorporates a filter for cancelling vibrations from the weighing signal. A method uses the container weighing system and the processor to indicate when a container is filled to contain a desired amount of berries and automatically reset when the filled container is removed.

23 Claims, 13 Drawing Sheets

(51) Int. Cl.
  *G01G 19/52* (2006.01)
  *G01G 13/285* (2006.01)
  *G01G 19/08* (2006.01)

(58) Field of Classification Search
  CPC ........ G01G 11/00; G01G 11/04; G01G 11/14; G01G 13/241; G01G 19/00; G01G 21/23; G08B 21/182; A01D 46/264; A01D 41/1271; B65B 1/34; B65B 25/04; B65B 1/32; B65B 43/56; B65B 57/04
  See application file for complete search history.

(56) References Cited

U.S. PATENT DOCUMENTS

| | | | | |
|---|---|---|---|---|
| 3,738,077 | A * | 6/1973 | Leach | B65B 1/32 53/502 |
| 4,262,807 | A * | 4/1981 | Leverett | B07C 5/18 209/592 |
| 4,363,408 | A * | 12/1982 | O'Brien | B07B 13/00 177/210 R |
| 4,437,527 | A * | 3/1984 | Omae | G01G 19/393 177/25.18 |
| 4,527,646 | A * | 7/1985 | Hirano | G01G 19/393 177/25.18 |
| 4,559,981 | A * | 12/1985 | Hirano | G01G 19/393 141/140 |
| 4,600,065 | A * | 7/1986 | Morris | G01G 13/241 141/128 |
| 4,750,322 | A | 6/1988 | Korthuis | |
| 5,010,719 | A | 4/1991 | Korthuis | |
| 5,024,047 | A * | 6/1991 | Leverett | B65B 1/34 209/912 |
| 5,027,593 | A | 7/1991 | Korthuis et al. | |
| 5,121,589 | A * | 6/1992 | Ventura | B65B 25/04 53/240 |
| 5,660,033 | A | 8/1997 | Korthuis et al. | |
| 6,000,200 | A * | 12/1999 | Germunson | B65B 25/04 53/154 |
| 6,070,402 | A | 6/2000 | Korthuis et al. | |
| 6,272,818 | B1 * | 8/2001 | Sebben | A01D 43/0631 56/10.2 R |
| 6,484,487 | B1 | 11/2002 | Buist et al. | |
| 6,508,049 | B1 * | 1/2003 | Cox | A01D 45/10 56/10.2 R |
| 7,083,039 | B2 | 8/2006 | Schloesser | |
| 7,211,745 | B1 * | 5/2007 | Brown | G01G 19/12 177/1 |
| D601,174 | S | 9/2009 | TerBeek | |
| 7,640,091 | B2 | 12/2009 | Berg et al. | |
| 8,205,742 | B2 | 6/2012 | TerBeek | |
| 8,635,845 | B1 * | 1/2014 | Palm | A01D 46/28 56/328.1 |
| 9,504,201 | B2 | 11/2016 | Schloesser | |
| 9,642,309 | B2 | 5/2017 | Schloesser et al. | |
| 9,668,417 | B2 | 6/2017 | Korthuis et al. | |
| 10,167,098 | B2 * | 1/2019 | Williamson | B65B 25/04 |
| 2007/0050116 | A1 * | 3/2007 | Jernigan | A01D 46/243 701/50 |
| 2011/0137611 | A1 * | 6/2011 | Campbell | G01G 19/083 702/173 |
| 2013/0317696 | A1 * | 11/2013 | Koch | A01D 41/1272 701/33.1 |
| 2014/0262548 | A1 * | 9/2014 | Acheson | G01G 11/003 177/1 |
| 2018/0035603 | A1 * | 2/2018 | Kremmer | A01C 21/005 |

OTHER PUBLICATIONS

Blueline Manufacturing Co., BH-100 Blueline Berry Harvester: Revolutionary Patented Technology, https://www.bluelinemfg.com/products/detail.html?itemid=56 printed Jul. 19, 2018, two pages.

Oxbo International Corporation, Berry Harvesters, Berry Brochure, http://www.oxbocorp.com/Products/Berries, eight pages.

* cited by examiner

BERRY HARVESTER WEIGHING SYSTEM

BACKGROUND OF THE INVENTION

Field of the Invention

The present invention relates to a berry harvester and weighing system for weighing containers of fruit and ensuring consistent filling.

Description of the Prior Art

The present invention relates to a berry harvester and weighing system that connects to a conveying system and weighs containers to ensure consistent filling levels. Berry harvesters are used to mechanically harvest fruit from plants. Such harvesters typically include beaters or other elements that dislodge the fruit from the plants and a conveyor system to deliver the fruit. The harvester may also include fans or other devices to aid in discharging undesirable materials such as leaves, sticks and other debris from the fruit. Berry harvesters typically deliver the fruit to an inspection conveyor that delivers the berries to a container. The containers are either typically flats holding approximately 3-15 pounds or lugs having the capacity of 15-25 pounds. Conventional harvesters deliver the fruit and workers known as stackers remove the flats or lugs when they estimate that a predetermined amount of fruit has been delivered to the container. In addition, typically a second container is placed below the first container so that fruit may be recovered while the upper containers are being switched.

Although such a system provides for recovering the harvested berries, the reliance on a worker to judge when a desired amount of fruit is in the container may vary. It has been found that the variability may increase depending upon the experience and skill of the workers and that changing of tasks during a shift on the harvester may be to increase or decrease in the perceived amount of fruit being collected. Moreover, as workers tire during a long shift, variability may increase or decrease. The variance in the weight of the fruit collected has further consequences as the fruit is delivered from flats often automatically, unloaded at a processing plant where fruit may be cleaned and/or in some cases, frozen or pureed. Efficiency at such plants is tied to the volume of fruit being processed and the selected operating level should be sufficient to cover the upper limit of fruit delivered. However, if the volume of fruit varies from container to container, the processing plant must be operated so as to accommodate the greater volume. However, if there is less variability, the plant may be able to operate at a higher level without exceeding its capacity limit. Throughput is increased and higher efficiencies are achieved.

It can therefore be seen that if the weight or volume of the fruit collected could be weighed and indicated to the workers handling the flats, then the variability would be decreased and human error could be eliminated. Although adding a scale may be possible, the repetition of the harvest process does not always allow proper monitoring while workers are multitasking. Moreover, obtaining accurate readings can be difficult as inherent vibrating elements while operating and also travels over uneven terrain. Such movement may negatively affect weighing and its accuracy. Moreover, in order to ensure that the fruit is evenly distributed across a container instead of gathering in one place and forming a mound, workers typically shake the containers to spread the fruit more evenly. Such vibrations and shaking may introduce false readings into a filling and weighing system.

It can therefore be appreciated that a berry harvester with a new and improved weighing system is needed. Such a system should ensure that variability is reduced and containers are filled to a selectable predetermined level. An indication should be given to the workers when the predetermined amount of berries has been received in the container. Moreover, such a system should provide for obtaining accurate readings that are not affected by vibrations of the harvester or shaking of containers by workers. Such a system should provide for the ability to automate loading and unloading and therefore decrease the labor needed and cost. Moreover, such a system may be coordinated with a Global Positioning System (GPS) to produce a yield map. The present invention addresses these as well as other problems associated with berry harvesters and the filling of containers.

SUMMARY OF THE INVENTION

The present invention is directed to a berry harvester and weighing system for weighing containers of fruit and ensuring consistent filling. An over the row berry harvester includes a chassis driving on wheels. Such berry harvesters typically have three or four wheels. A picking assembly engages plants that pass through a picking tunnel. The picking assembly generally includes beaters or other plant engagement devices that dislodge fruit from the plants. A catching system includes movable catch plates that deliver the dislodged fruit to a system of conveyors. The fruit while being conveyed encounters a cleaning system that has fans that blow away leaves, sticks and other debris. An inspection station at the container fill system provides for removal of debris and any fruit that does not achieve acceptable quality. From the inspection station the fruit is dumped into a container.

An operator sits in a driver's seat to access controls for operating the harvester. Workers generally referred to as sorters, help to inspect at the inspection station. Stackers fill containers on an operations platform on the harvester. Sorter seats provide a place for workers to conduct inspection and filling of containers. Controls to operate the filling and weighing station are accessed by at least one of the sorters, stackers or operators. Railings around the platform provide safety while ladders provide access for the workers. The operations platform may include racks to store containers. Moreover, the operations platform also provides a storage area for containers after they are filled with fruit. Therefore, empty containers may be removed after passing through the container filling system and then stored on the harvester when filled. The filled containers are typically removed at an end of the row or during other accessible times during harvest and transported in the containers to the fruit processing plant. Conventional containers typically come in two standard sizes. A first type of contain is known as a "flat" has a capacity of 3-15 pounds while a second type of container, known as a "lug" has a capacity of 15-25 pounds.

The container fill system receives berries delivered from the conveyor. A final blower delivers air to provide further removal of debris through a mesh type conveyor that allows for air to flow through the conveyor to achieve a cleaner harvested crop. The fruit then passes through an inspection station. A container pan is configured to support fruit containers that fill with fruit as it falls off the end of a final conveyor. The pan has a large center opening that allows for berries to fall to a container supported on a lower pan. In this manner, even when the upper containers are being switched, the conveyor continues to operate and deliver berries to a container supported on the lower pan, thereby ensuring that all harvested crop is delivered to a container. Workers typically slide a container such as a flat from one side of the container fill system when full and slide the next empty container immediately behind the full container to minimize gaps. Therefore, less fruit falls to the container on the lower support. Workers are able to sit in the seats and one is able to operate controls for the container fill system as well as to conduct inspection.

The container fill station also includes load cells supporting a main deck also having a center opening. Switches are engaged by the containers when placed on the weighing deck. The controls allow for adding a weight for the tare of equal to the container weight. The controls may include a display or alarm. It can be appreciated that the weighing system is automatic to set and weigh the crop in a container. The controls may include a display including an alarm such as a light and/or an audible alarm or bell. The controls preferably include an isolation system that eliminates vibrations from machinery and therefore ensures that there are no false readings and the actual weight of the berries is accurate. Such an isolator or filter should also take into account that the operators often may shake the containers while they are being filled to ensure that the berries in the container are spread more evenly and therefore are easier to handle as well as achieving more even unloading at the processing facility. The system also utilizes the switches and load cells in order to ensure that the weighing system resets when a new container is placed on the weighing deck. The system also provides for inputting different variables related to filling, corresponding to the containers being used and the load requirements. The tare may be selected to match the weight of the container being utilized. Moreover, as different processing facilities may request different loads in each container so that the particular load may be selected.

The weighing system allows the type of container to be input so that the tare may be taken into account. Alarms may be activated to signal when the preselected weight is reached. In some embodiments, the type of alarm and readouts may also be programmed. When the weighing system has been set up, the harvester may proceed with harvesting along rows with the plants passing through the picking tunnel. The picking assembly engages the plants and dislodges fruit. The dislodged fruit falls onto the catching system where it is directed to the conveyor assembly. Debris is separated from the fruit by the cleaning system. Workers may also manually inspect the fruit to remove fruit that is not acceptable and/or other debris. The workers place a container on the upper pan and a backup container in the lower pan. Fruit is delivered until the preselected amount of fruit is received into the container on the upper pan. The system then provides an alarm and/or readout to the operators to remove the sufficiently filled container and slide a second empty container into the space on the weighing deck. The full container is then stored on the deck or other storage area until the end of the row is reached or a convenient area for unloading the containers with fruit is reached. The containers are typically given a back-and-forth shake by the stackers to evenly distribute fruit while the container is being filled. The weighing system is able to filter out such movement as well as the vibration from the over the row harvester and provide an accurate reading. Once the desired weight is achieved, the alarm automatically activates.

When the full container is removed, the system resets for the new empty container. The process is repeated until the containers must be off loaded. Moreover, if conditions or requirements change, the container fill system may be reset with different inputs to reflect the changes. The harvester may also be in communication with a global positioning system (GPS), such as a DataStar Inc. system to provide data on the harvest in relation the position of the harvester. Use of a GPS provides for producing a yield map of the fields being harvested.

These features of novelty and various other advantages that characterize the invention are pointed out with particularity in the claims annexed hereto and forming a part hereof. However, for a better understanding of the invention, its advantages, and the objects obtained by its use, reference should be made to the drawings that form a further part hereof, and to the accompanying descriptive matter, in which there is illustrated and described a preferred embodiment of the invention.

BRIEF DESCRIPTION OF THE DRAWINGS

Referring now to the drawings, wherein like reference letters and numerals indicate corresponding structure throughout the several views.

DETAILED DESCRIPTION OF THE PREFERRED EMBODIMENT

Figure 1:
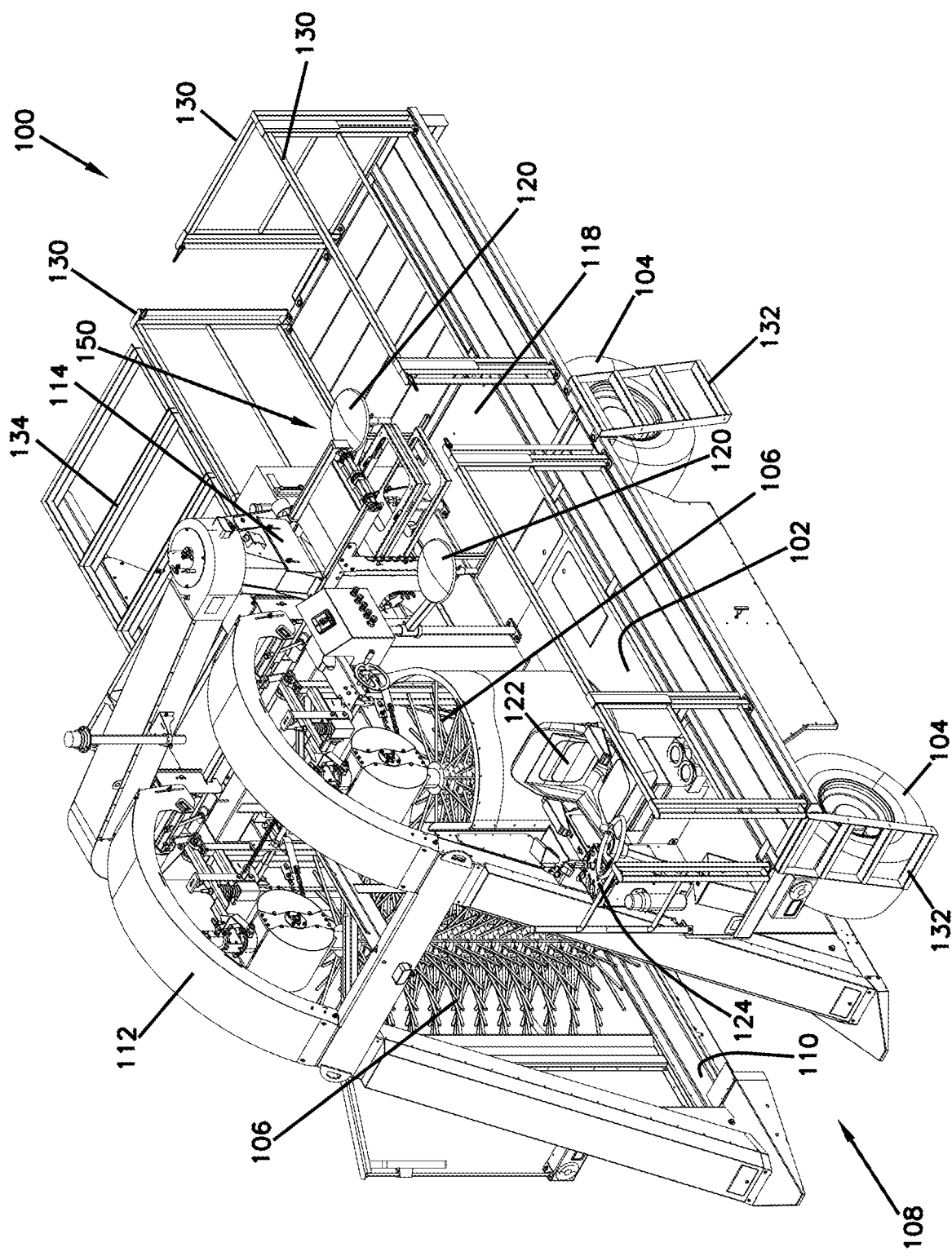
FIG. 1 is a perspective view of a berry harvester according to the principles of the present invention.
Figure 2:
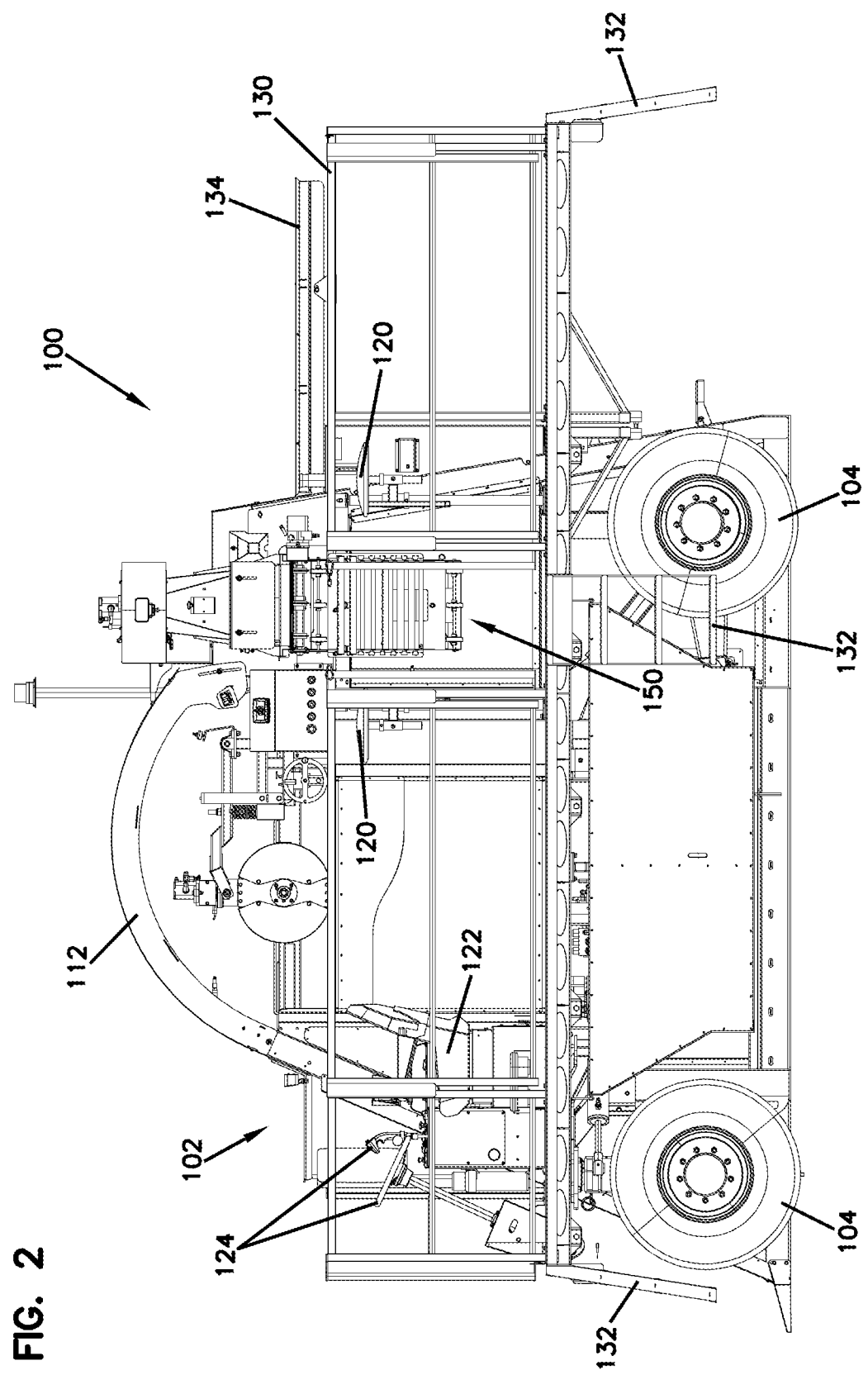
FIG. 2 is a side elevational view of the berry harvester shown in FIG. 1.
Figure 3:
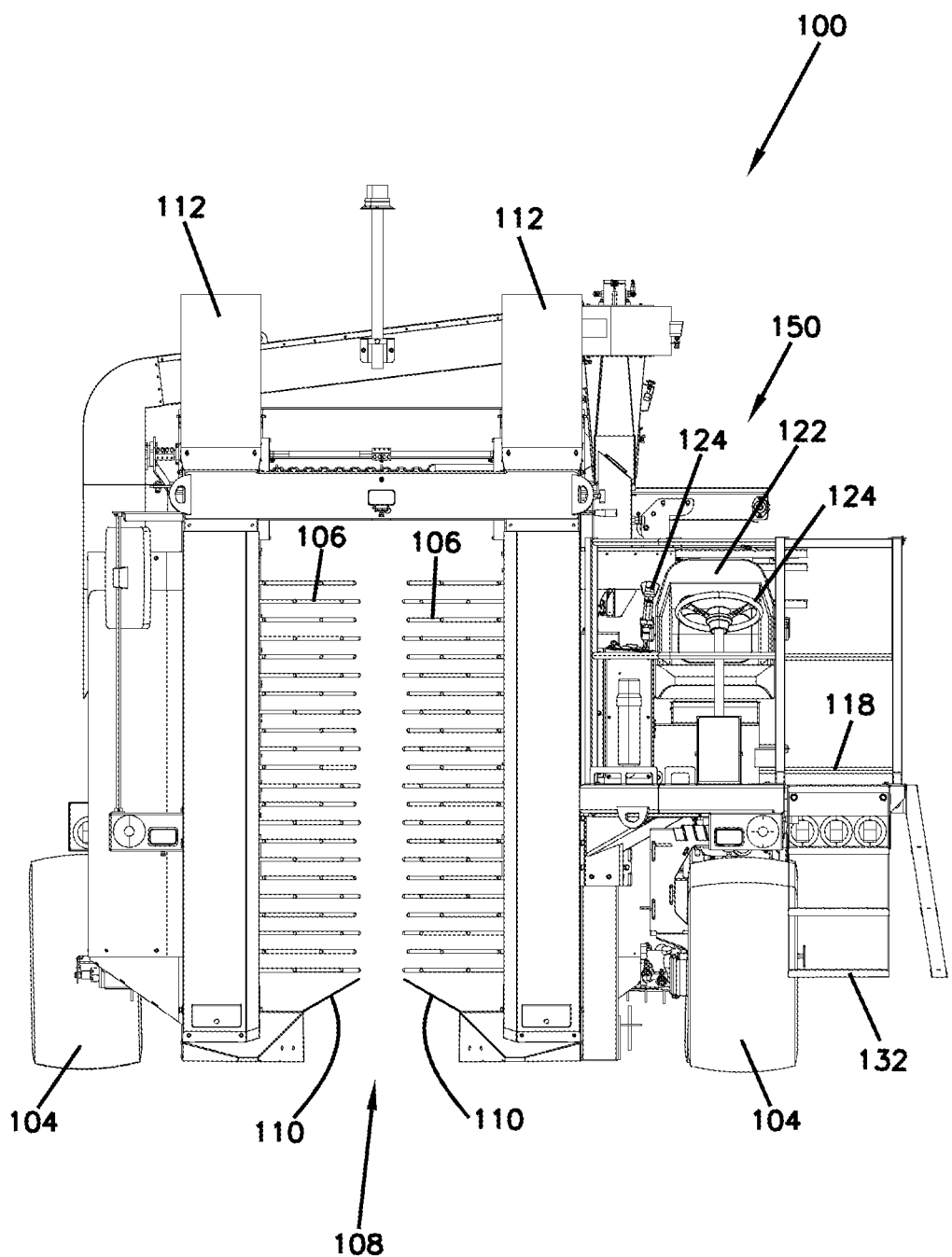
FIG. 3 is a front elevational view of the berry harvester shown in FIG. 1.

Referring now to the drawings, and in particular FIGS. 1-3, there is shown an over the row berry harvester, generally designated (100). The harvester (100) includes a chassis (102) driving on wheels (104). Although in the embodiment shown the harvester (100) is a three wheel harvester, it can be appreciated that four wheel harvesters are also foreseen. A picking assembly (106) engages rows of plants that pass through a picking tunnel (108). The picking assembly (106) generally includes of beaters, which may take on many configurations. Other plant engagement devices that dislodge fruit from the plants may also be utilized. A fruit catch system includes movable catch plates that collect the dislodged fruit, which rolls to a conveyor system (112). The conveyor system (112) dumps the collected fruit onto a container fill system (150). A cleaning system (114) includes fans and may also include a manual inspection station (120) at the container fill system to remove unwanted leaves, dirt and debris other than the fruit.

Figure 11:
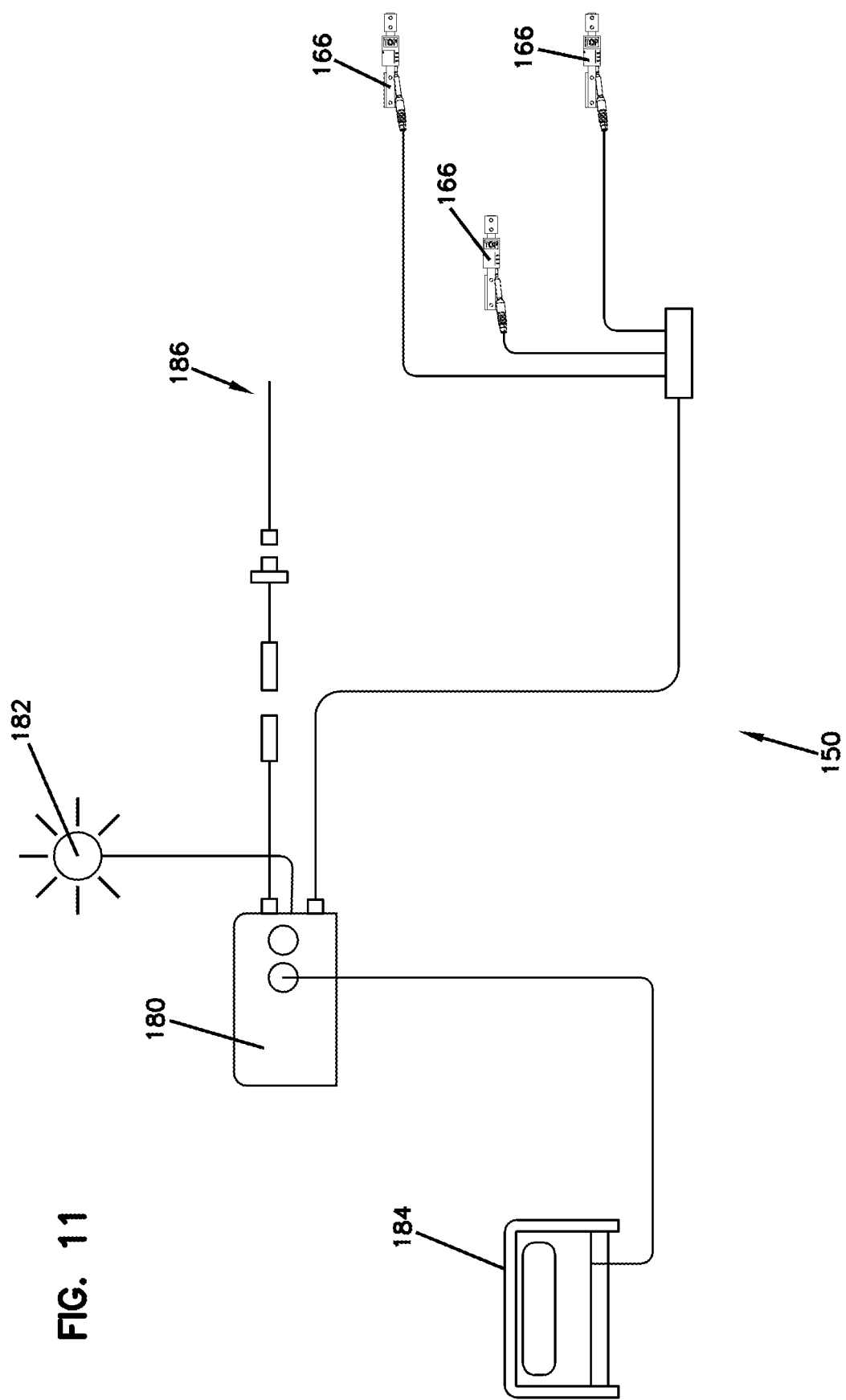
FIG. 11 is a diagrammatic view of sensing and display systems for the weighing system shown in FIG. 6.
Figure 13:
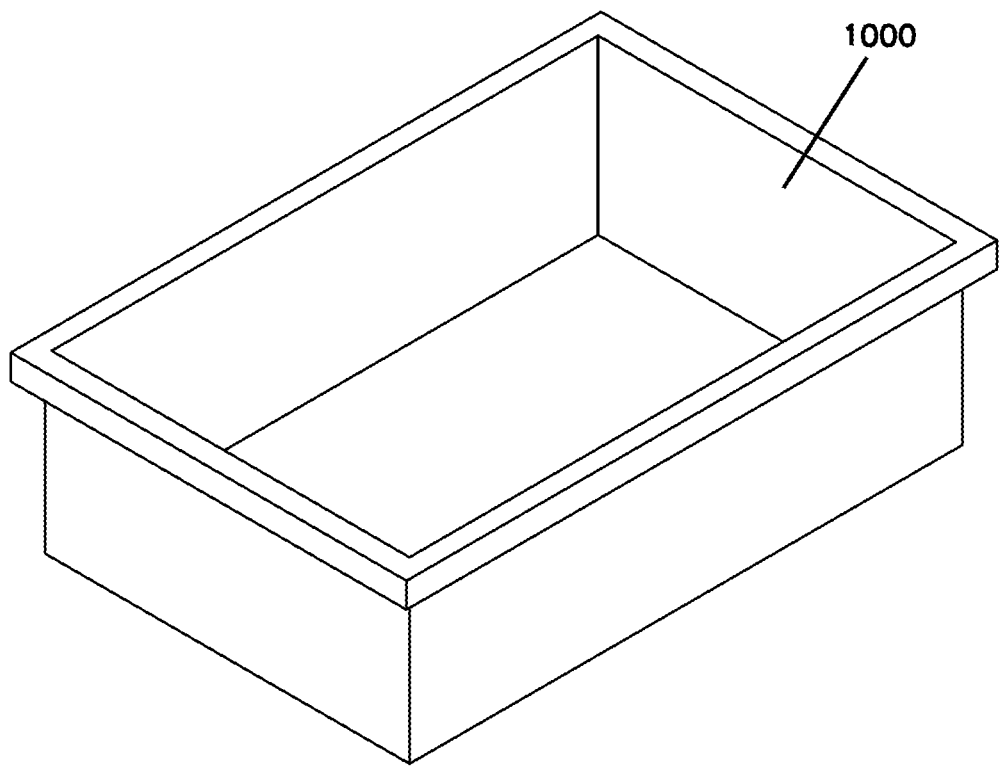
FIG. 13 is a perspective view of a lug style container.
Figure 14:
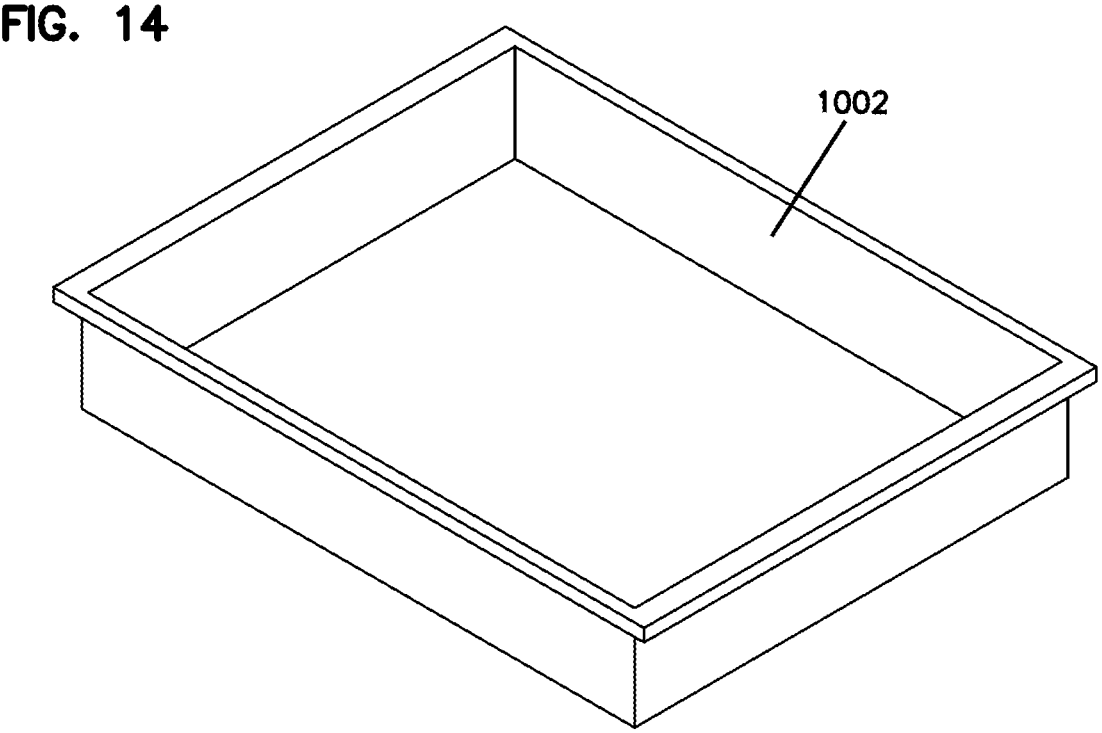
FIG. 14 is a perspective view of a flat style container.

An operator sits in a driver's seat (122) to access the harvester controls (124). Sorters inspect fruit and stackers fill containers on an operations platform (118). Sorter seats (120) provide a place for inspecting fruit before it is put in containers, such as lugs (1000) shown in FIG. 13 and flats (1002) shown in FIG. 14. A processor/controls (180), shown most clearly in FIG. 11, are accessed by at least one of the sorters or stackers to operate the filling and weighing system (150). Railings (130) provide safety while ladders (132) provide access to the harvester for the operators. Racks (134) store empty containers at the rear of the harvester (100). Moreover, the operations platform (118) also provides a storage area for containers. Therefore, empty containers may be removed through the container filling system (150) and then stored when filled on the berry harvester (100) and removed at an end of the row or when the harvester is easily accessed. The filled containers are then transported to the fruit processing plant.

The harvester (100) can use different types of containers. In the embodiment shown in FIG. 13, a first type of container (1000) commonly used with blueberries is known as a "lug" has a capacity of 15-25 pounds. Another conventional type of container (1002) shown in FIG. 14, known as a "flat" has a capacity of 3-15 pounds. Either type of container may be used with the harvester (100) of the present invention.

Figure 4:
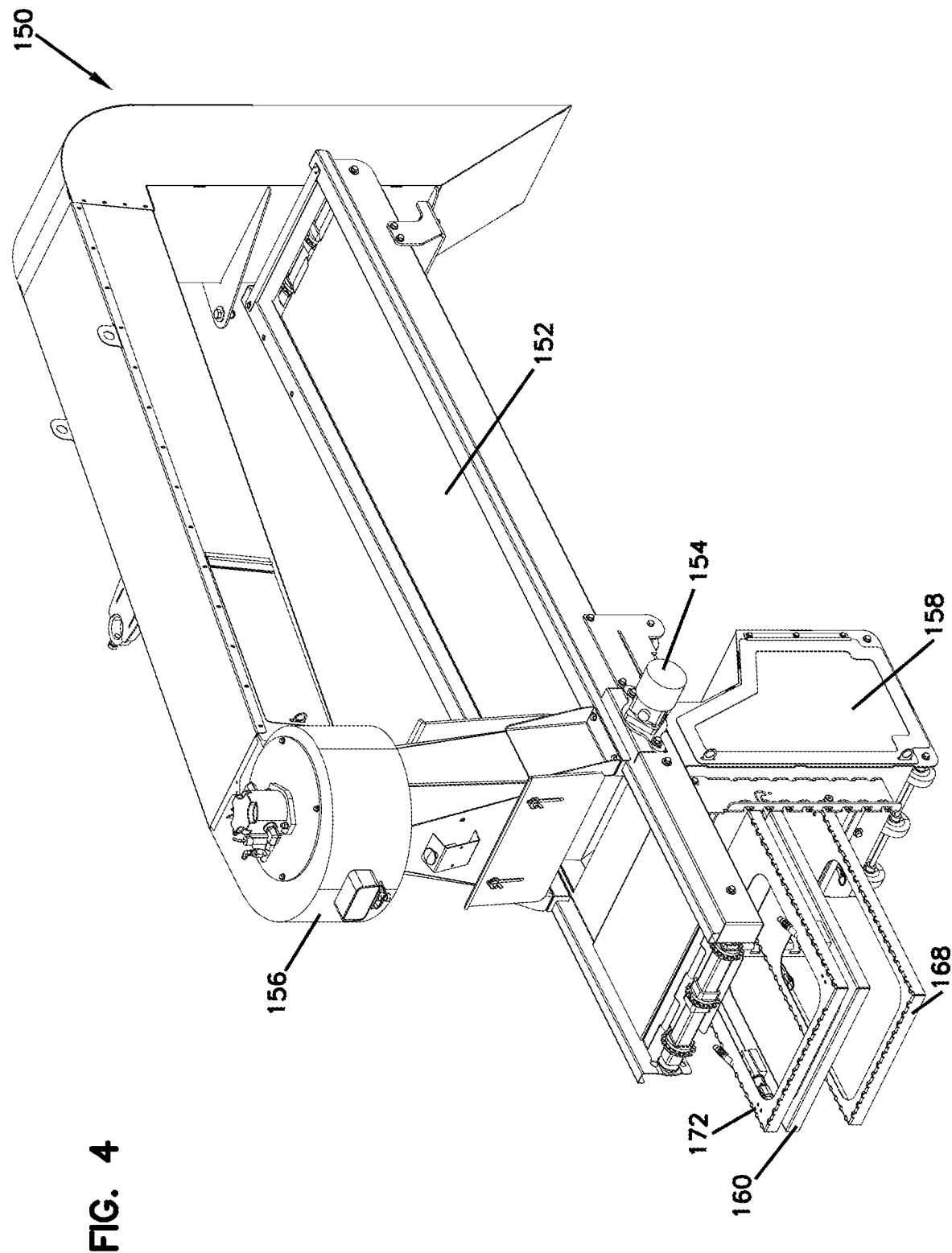
FIG. 4 is a perspective view of an inspection and container loading system for the berry harvester shown in FIG. 1.
Figure 5:
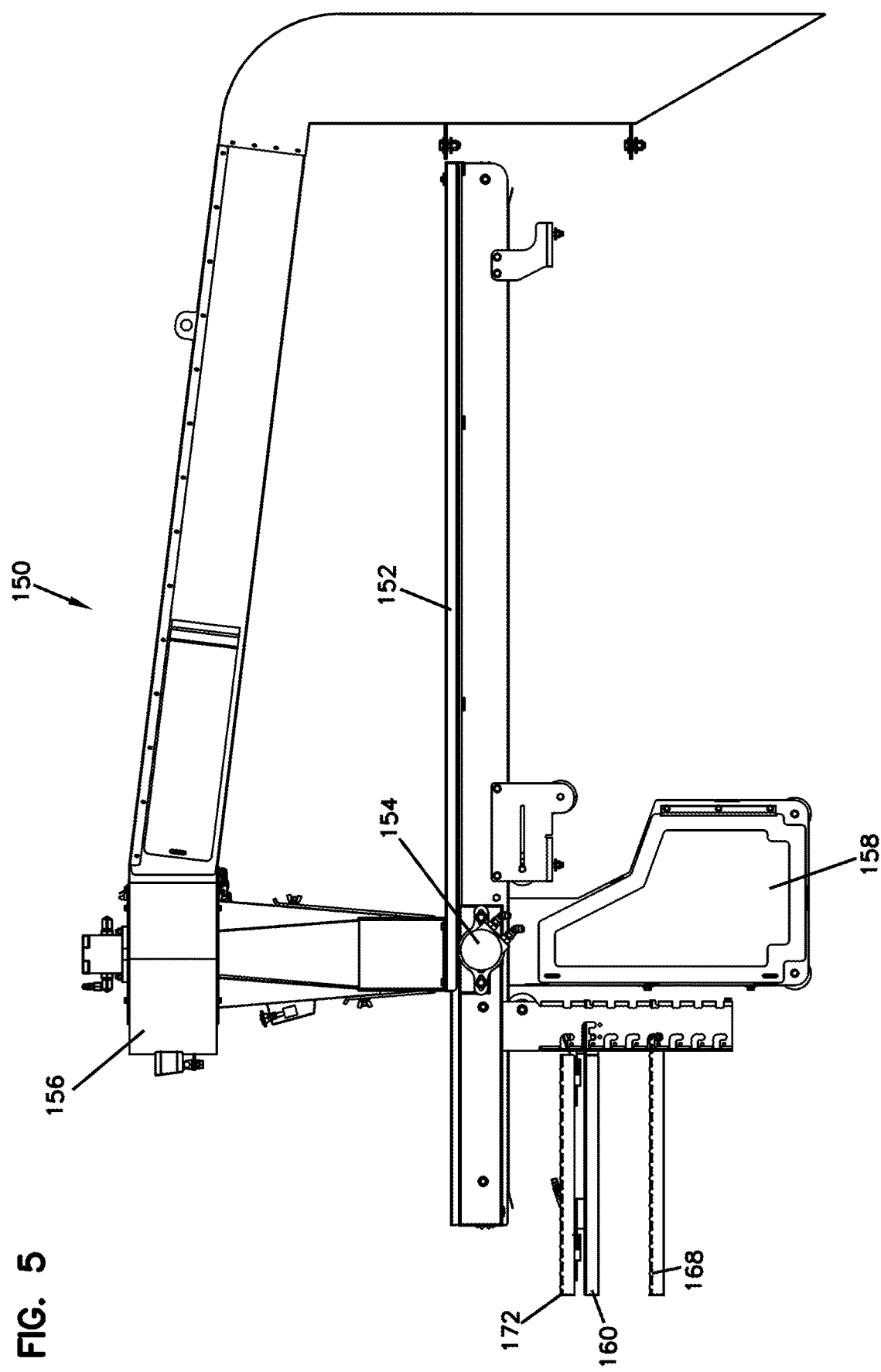
FIG. 5 is a rear elevational view of the inspection and container loading system shown in FIG. 4.
Figure 6:
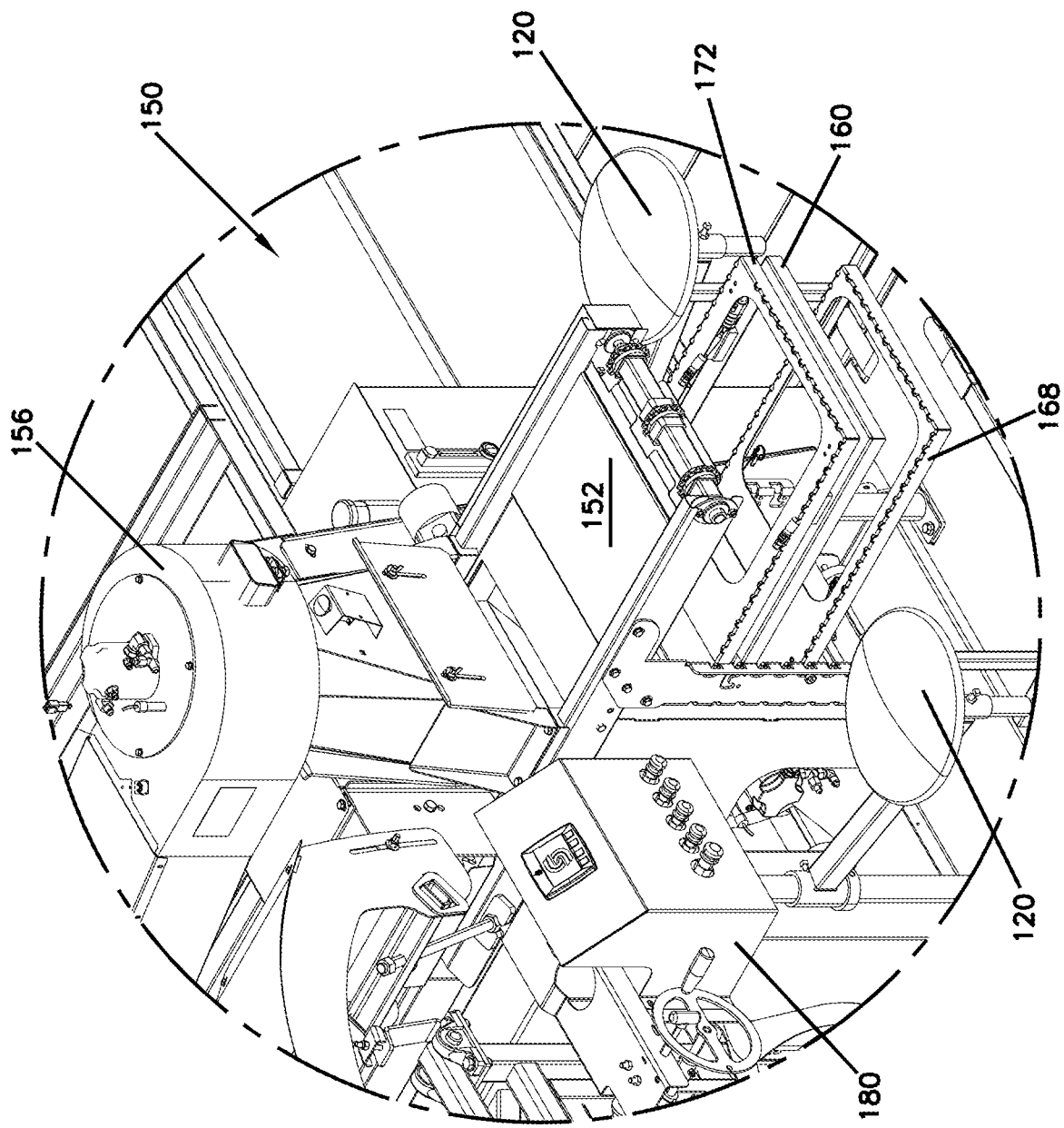
FIG. 6 is a perspective view of a weighing system for the inspection and container loading system shown in FIG. 4.
Figure 7:
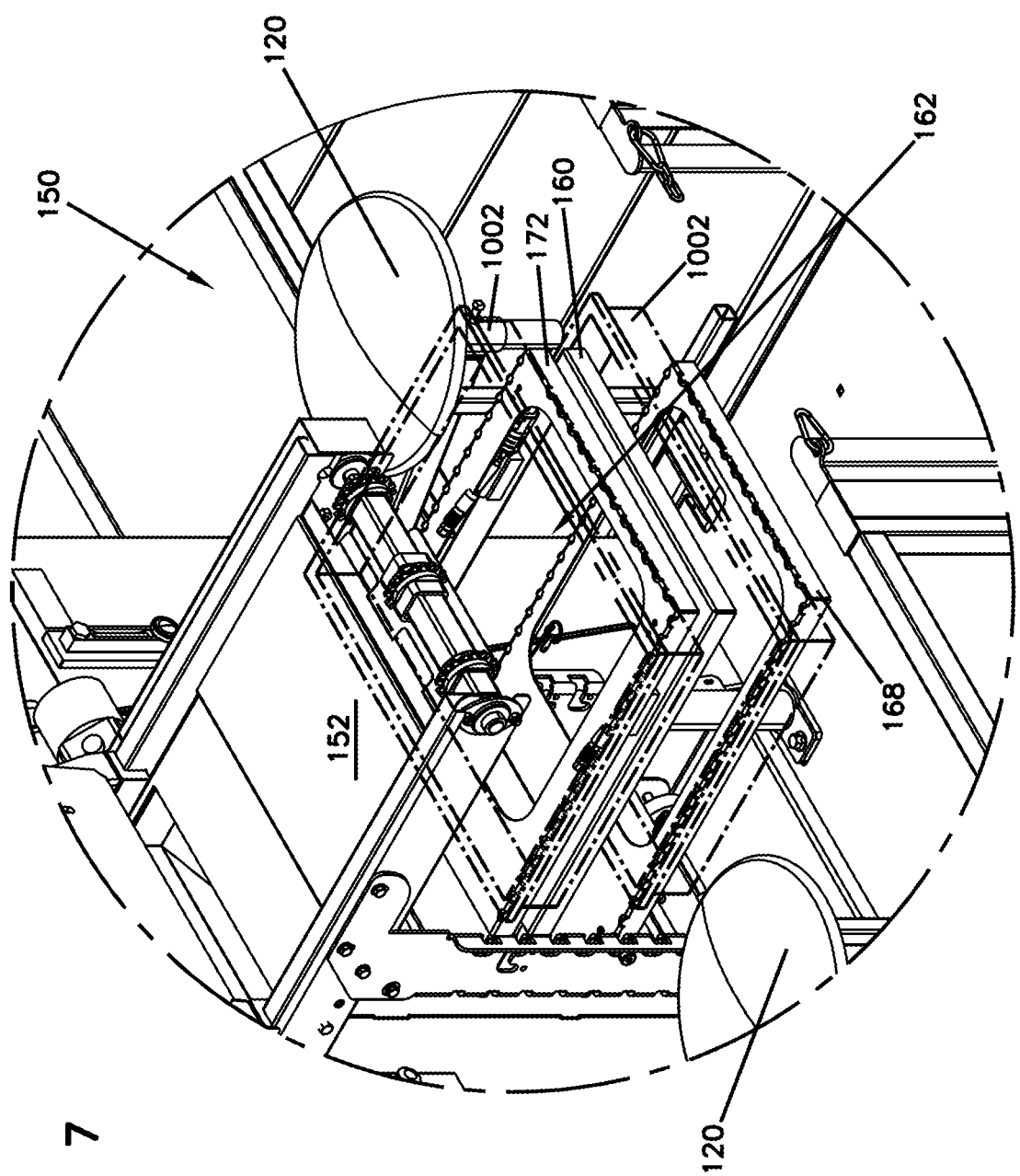
FIG. 7 is a perspective view of the weighing system shown in FIG. 6 with containers.
Figure 8:
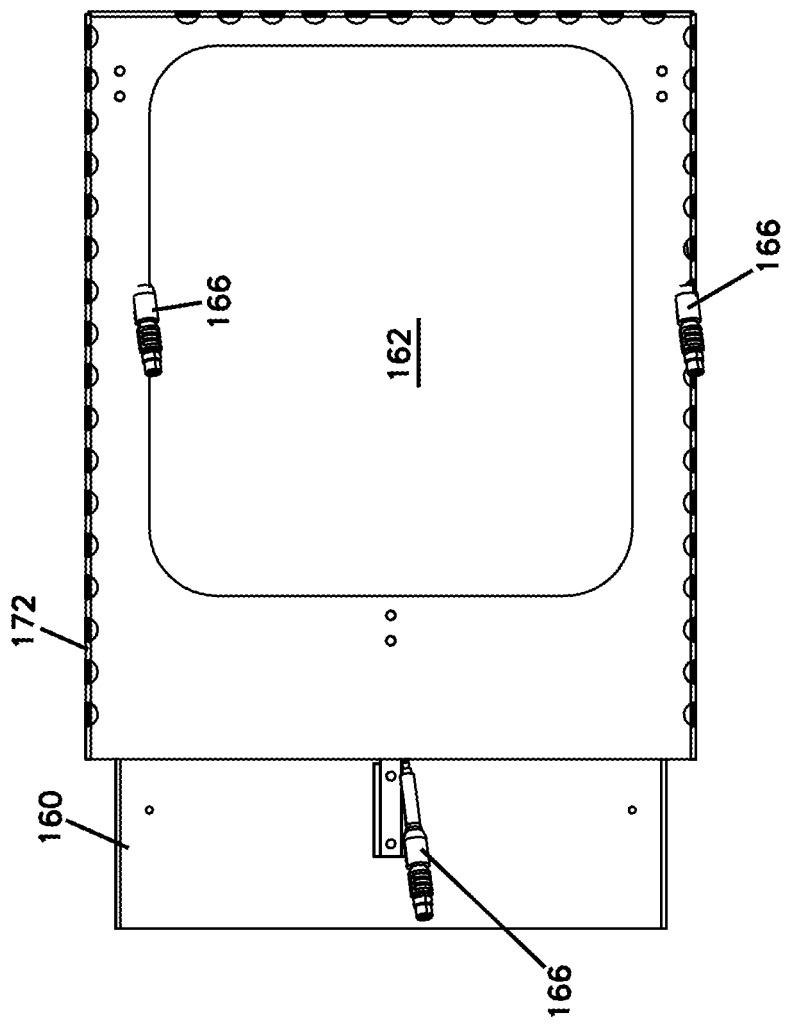
FIG. 8 is a top plan view of the weighing system shown in FIG. 6.
Figure 9:
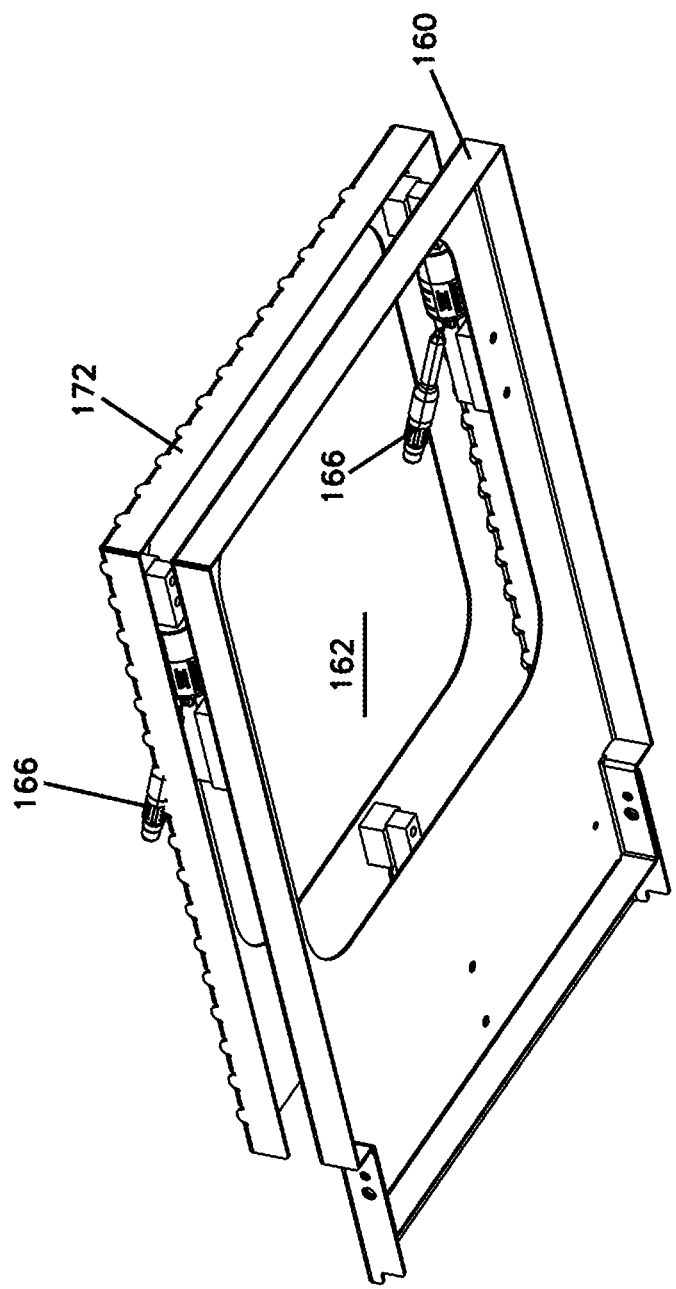
FIG. 9 is a bottom perspective view of the weighing system shown in FIG. 6.
Figure 10:
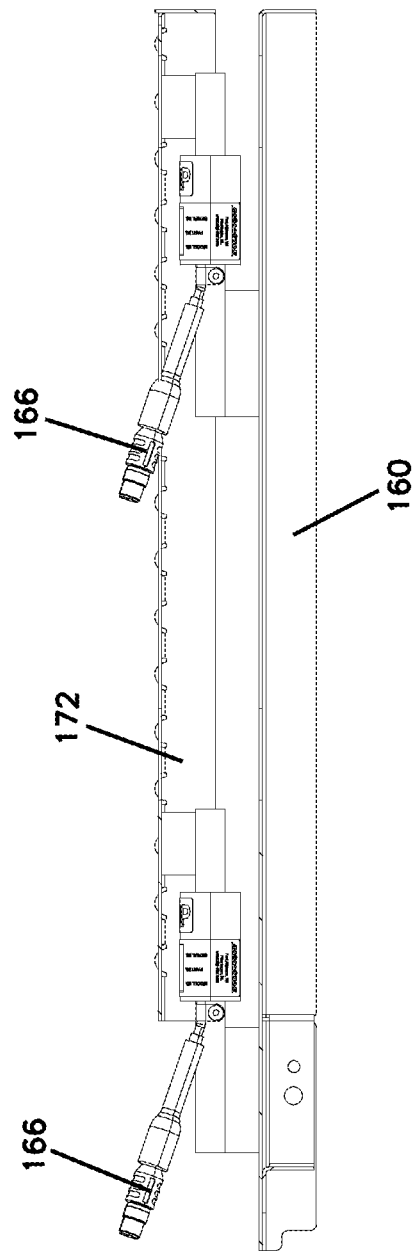
FIG. 10 is a side elevational view of a container support and load cells for the weighing system shown in FIG. 6.

Referring now to FIGS. 4 and 5, after the berries have been delivered from the conveyor buckets, they are delivered to the container fill system (150). The container fill system (150) includes a cross conveyor (152) driven by a motor (154). A container pan (160) is configured to support a main deck (172), which receives containers that receive fruit as it falls off the end of the conveyor (152). A final blower (158) delivers air to remove matter other than fruit. The final blower (158) is used in conjunction with a suction fan (156). Together, the fans (156, 158) clean debris from the fruit. The belt of conveyor (152) is typically a mesh type element or formed of connected elements that allow for air to flow through the conveyor to achieve a cleaner harvested crop. As also shown in FIGS. 5-9, the berries fall off the conveyor (152) into the containers, shown as flats (1002), which are supported on a support pan (160). The pan (160) has a large center opening (162) that allows for berries to fall to another container supported on a lower pan (168). In this manner, even when the upper containers (1000 or 1002) are being switched, the conveyor (152) continues to operate and deliver berries to a container supported on the lower pan (168), thereby ensuring that all harvested crop is delivered to a container (1000). Stackers typically slide a container, such as a flat, from one side of the container fill system (150) when full and slide the next empty container immediately behind the full container (1000) to minimize gaps so that less fruit falls to the container (1000) on the lower support (168). Sorters are able to sit in the seats (120) and one of the workers is able to operate controls for the container fill system (150) as well as the fruit conveying systems and blowers (156, 158).

Referring to FIGS. 6-11, the container fill and weighing station (150) also includes load cells (166) engaging a main deck (172) also having a center opening. The load cells (166) are actuated by the containers being placed on the weighing deck (172). The processor/controls (180) provide for taking the weight of the container into account and using a tare equal to the container weight. The processor/controls (180) preferably include a display (184) and/or alarm (182). It can be appreciated that the fill and weighing system (150) is automatically set to weigh the crop in a container (1000). The controls include a display (184) of various parameters including the weight of the fruit in the currently filling container, total weight harvested and weight of harvested fruit since the last full containers were removed. The harvester (100) may include global positioning system (186), such as a DataStar Crop Analyst system, to track and map crop data. The alarm (182) may be configured as a light and/or an audible alarm or bell. The processor/controls (180) also incorporate an isolation system that eliminates vibrations from machinery and therefore ensures that there are no false readings and the actual weight of the berries in a container is accurate. Such an isolator or filter should also take into account shaking motion that the stackers often impart to the containers (1000 or 1002) while the containers are being filled to ensure that the berries in the container are spread more evenly and therefore are easier to handle as well as achieving more even unloading and feeding at the processing facility. The system (150) also utilizes the load cells (166) in order to ensure that the weighing system automatically resets when a filled container is removed from the weighing deck (172). The processor (180) also provides for inputting different variables depending on the container being used and the desired load. The tare may be selected to match the weight of the container being utilized. Moreover, different processing facilities may request different loads in each container so that the particular load at which the alarm (182) activates may also be predetermined and selected for the desired loads.

Figure 12:
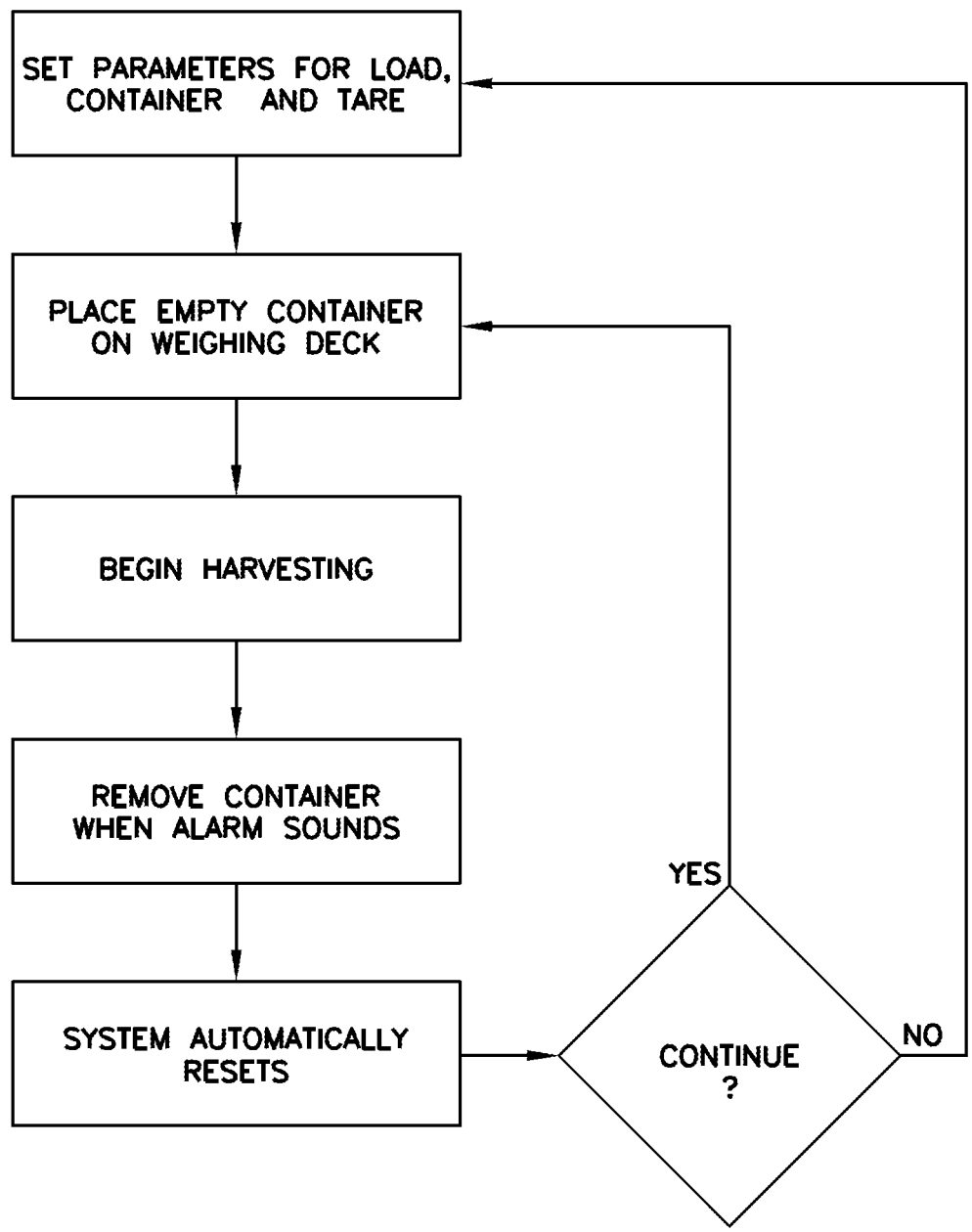
FIG. 12 is a flow diagram for the weighing system.

In operation, the weighing system is set up as shown in FIG. 12. The weighing system allows the type of container to be input so that the tare may be taken into account. Moreover, the desired weight is input so that the alarms will signal when the preselected weight is reached. In some embodiments, the type of alarm and readouts may also be programmed. When the weighing system has been set, the harvester (100) may proceed with harvesting along plant rows with the fruit plants passing through the picking tunnel (108). The picking assembly (106) engages the plants and dislodges fruit. The fruit falls onto the catching system (110) where it is directed to the conveyor assembly (112). Material other than fruit is separated by the cleaning system (114). The conveyors (112) deliver the fruit to the fill and weighing system (150) where the fans (156, 158) provide final separation. Workers may also inspect the fruit to remove fruit that is not acceptable and/or other debris. The operators provide a container on the upper pan (160) and a backup container (1000) in the lower pan (168). Fruit is delivered until the preselected amount of fruit is received into the container (1000). The system (150) then provides an alarm and/or readout to the operators that the container is filled to the desired weight and to remove the filled container and slide a second empty container into the space on the weighing deck (172). The filled container is then stored on the deck (118) until the end of the row is reached or a convenient point for unloading the filled containers is reached.

The containers are typically given a back-and-forth shake by the stackers to evenly distribute fruit. The processor (180) is able to filter out such movement as well as to filter out the vibration imparted from the over the row harvester (100) and provide an accurate reading. Once the desired weight is achieved, the processor (180) automatically resets the system (150) for a new empty container. The process is repeated until the system (150) is shut off. It can be appreciated that interruptions including lengthy pauses do not affect the weighing system. Moreover, if conditions or requirements changes, the container fill system (150) may be reset with different inputs to reflect the requirements.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A berry harvester, comprising:
   a chassis;
   a berry removal system;
   a berry delivery system;
   a container filling station, the container filling station comprising:
      a berry delivery apparatus;
      a container support;
      a container weighing system generating a weighing signal;
      a processor in communication with the weighing system, the processor cancelling vibrations from the weighing signal.

2. The berry harvester according to claim 1, the container filling station being configured to allow berries to drop into a container supported on the container support.

3. The berry harvester according to claim 1, wherein the container weighing system comprises an alarm.

4. The berry harvester according to claim 3, wherein the container weighing system is adjustable for setting a specified weight at which the alarm is triggered.

5. The berry harvester according to claim 1, wherein the container weighing system comprises a visual alarm.

6. The berry harvester according to claim 1, wherein the container weighing system comprises an audible alarm.

7. The berry harvester according to claim 1, wherein the processor provides a tare for a container to the weighing system.

8. The berry harvester according to claim 1, wherein the processor provides an adjustable tare for a container to the weighing system.

9. The berry harvester according to claim 1, wherein the weighing system comprises a load cell.

10. A berry harvester according to claim 1, wherein the processor is in communication with a position indicator, the processor being configured to map yields.

11. A berry harvester according to claim 1, further comprising an inspection station.

12. A berry weighing system configured for installation on a harvester, comprising:
    a container filling station configured to receive harvested fruit, the container filling station comprising:
    a container support;
    a container weighing system weighing a container and fruit in the container to determine a weight of the container including the fruit in the container, and generating a weighing signal;
    a processor in communication with the weighing system and cancelling vibrations from the weighing signal; and
    an alarm signaling when the container including the fruit in the container has reached a specified weight.

13. The berry harvester weighing system according to claim 12, the container filling station being configured to allow berries to drop into a container supported on the container support.

14. The berry harvester weighing system according to claim 13, wherein the container support comprises:
    an upper container support, the upper container support defining a center opening;
    a lower container support directly below the upper container support.

15. The berry harvester weighing system according to claim 14, wherein the container weighing system is adjustable for setting the specified weight at which the alarm is triggered.

16. The berry harvester weighing system according to claim 12, wherein the processor provides a tare for a container to the weighing system.

17. The berry harvester weighing system according to claim 12, wherein the processor provides an adjustable tare for a container to the weighing system.

18. The berry harvester weighing system according to claim 12, wherein the weighing system comprises a load cell.

19. A berry harvester weighing system, configured for installation on a harvester, comprising:
    a container filling station configured to receive harvested fruit, the container filling station comprising:
    a container support;
    a container weighing system weighing a container and fruit in the container and generating a weighing signal;
    a processor in communication with the container weighing system and cancelling vibrations from the weighing signal; wherein the processor is in communication with a position indicator, the processor being configured to map yields.

20. A method of harvesting and filling containers with fruit with a harvester having a container filling station, comprising:
    removing fruit from plants;
    delivering the fruit to the container filling station and filling containers with the fruit;
    weighing the containers on a container support to generate a weighing signal as the containers are filled with fruit;
    processing the weighing signal;
    cancelling vibrations from the weighing signal; and
    activating an alarm when the container on the container support is filled to a predetermined weight indicated by the weighing signal.

21. The method of harvesting and filling containers with fruit according to claim 20, further comprising cleaning the fruit to remove debris and inspecting the fruit.

22. The method of harvesting and filling containers with fruit according to claim 20, wherein the container support comprises an upper container support, the upper container support defining a center opening; the method comprising:
    passing the acceptable fruit to a first container on the upper container support;
    during switching of first containers on the upper container support, allowing acceptable fruit to fall through the center opening of the upper container support to a second container on a lower container support directly below the upper container support.

23. The method of harvesting and filling containers with fruit according to claim 20, further comprising switching a first container filled to the predetermined weight with an empty first container.

* * * * *